United States Patent [19]
Gibbons

[11] 3,743,469
[45] July 3, 1973

[54] MOLD CAVITY LOCKING APPARATUS

[76] Inventor: James H. Gibbons, 1735 E. Evanston Road, Tipp City, Ohio 45371

[22] Filed: Aug. 27, 1971

[21] Appl. No.: 175,671

[52] U.S. Cl.................. 425/450, 100/271, 100/291, 425/DIG. 221
[51] Int. Cl............................................... B29f 1/00
[58] Field of Search................... 425/450, 242, 453; 164/137, 341, 342, 343; 100/271, 291

[56] References Cited
UNITED STATES PATENTS

| | | | |
|---|---|---|---|
| 2,115,590 | 4/1938 | Ryder | 425/450 X |
| 2,370,622 | 3/1945 | Gastlow | 425/450 X |
| 2,586,896 | 2/1952 | Wittlin | 164/343 X |
| 3,327,353 | 6/1967 | Eggenberger | 425/450 |
| 3,543,346 | 12/1970 | Breher | 425/242 |
| 3,669,593 | 6/1972 | Cyriax | 425/242 X |

FOREIGN PATENTS OR APPLICATIONS

| | | | |
|---|---|---|---|
| 885,480 | 8/1953 | Germany | 425/242 |

Primary Examiner—J. Spencer Overholser
Assistant Examiner—Michael O. Sutton
Attorney—Jacox & Meckstroth

[57] ABSTRACT

A first mold member is supported by a platen for movement between open and closed positions relative to a mating second mold member mounted on the frame which supports the platen. A first wedge member extends across the back of the platen, and a second wedge member is supported by the frame for aligned sliding engagement with the first wedge member to effect locking of the mold members after they are closed. In one embodiment, the second wedge member is also supported for lateral movement to an offset position relative to the first wedge member to provide for quickly opening and closing the mold members. Movement of the first mold member and the movement of the second wedge member are produced by a set of fluid cylinders which are actuated in timed sequence and are effective to exert a continuous force to hold the mold members in their closed positions. In another embodiment, the second wedge member is supported by a plate which may be quickly retracted and extended for opening and closing the mold member.

9 Claims, 12 Drawing Figures

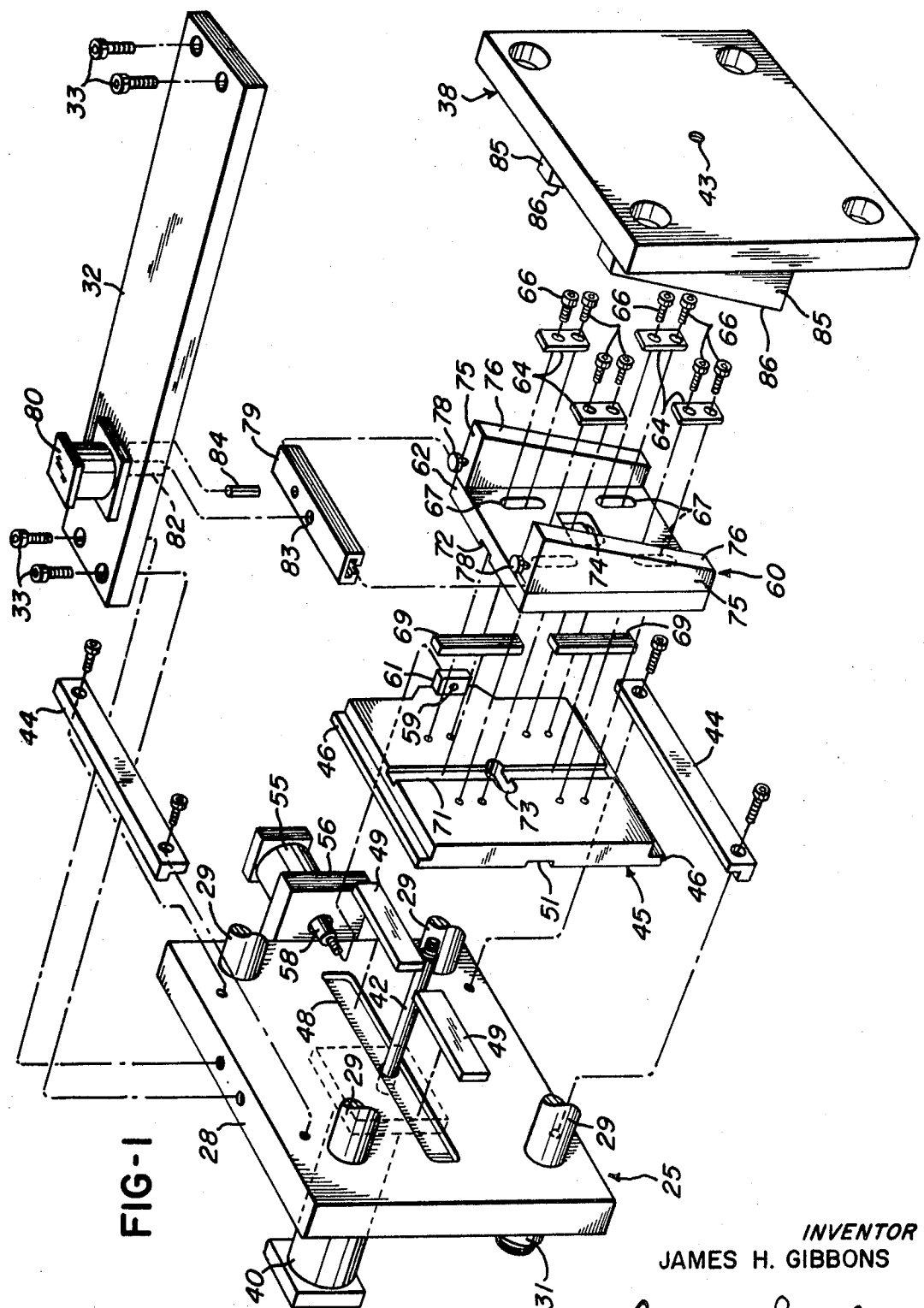

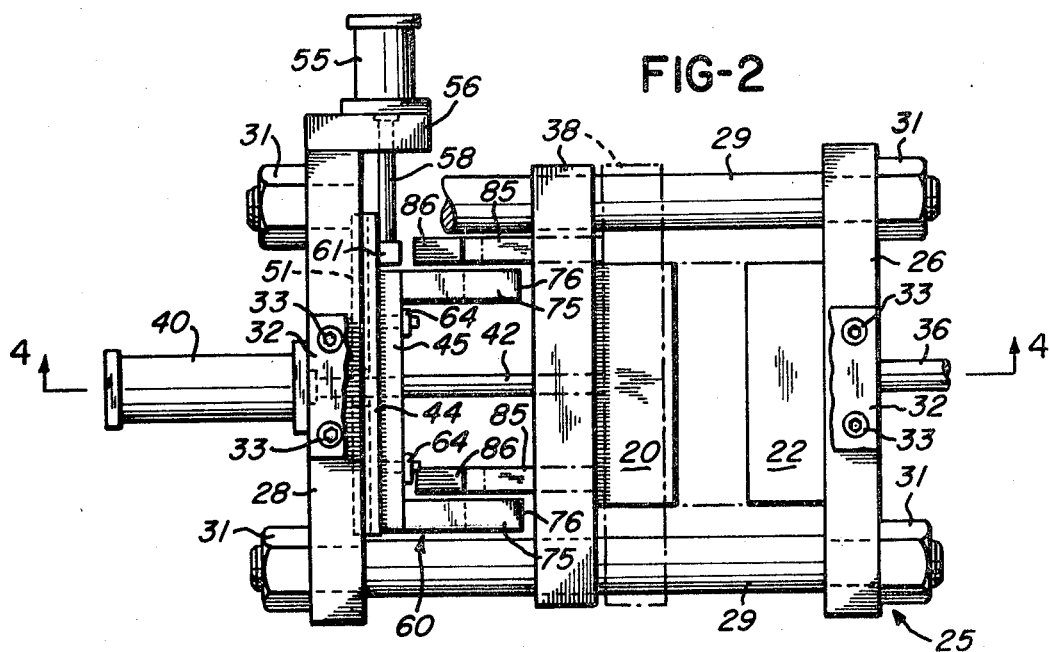
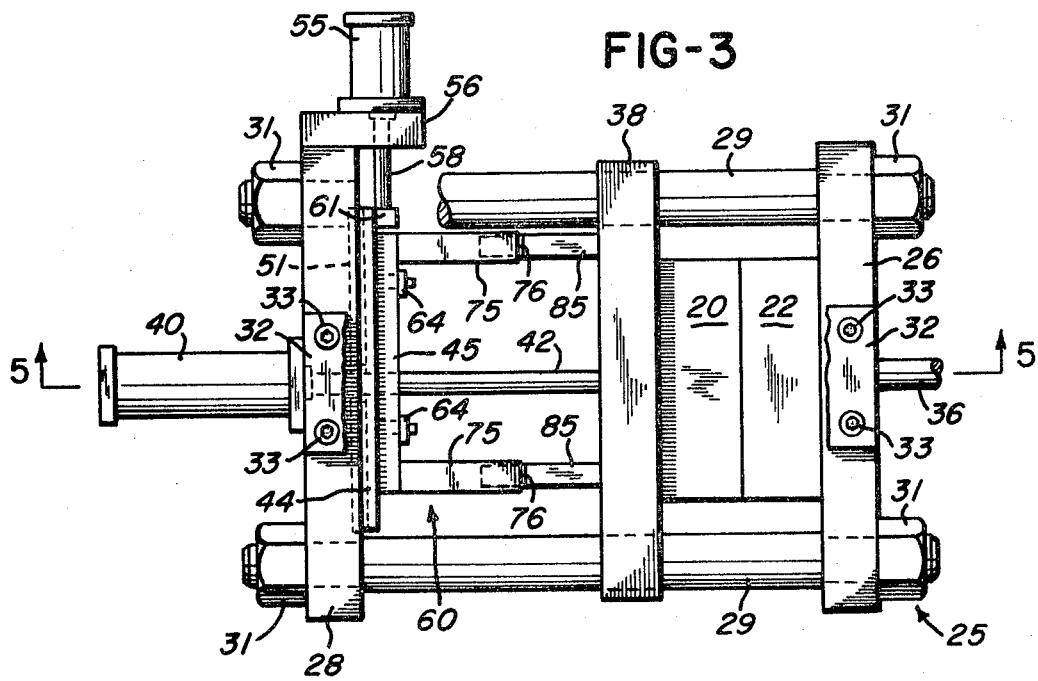

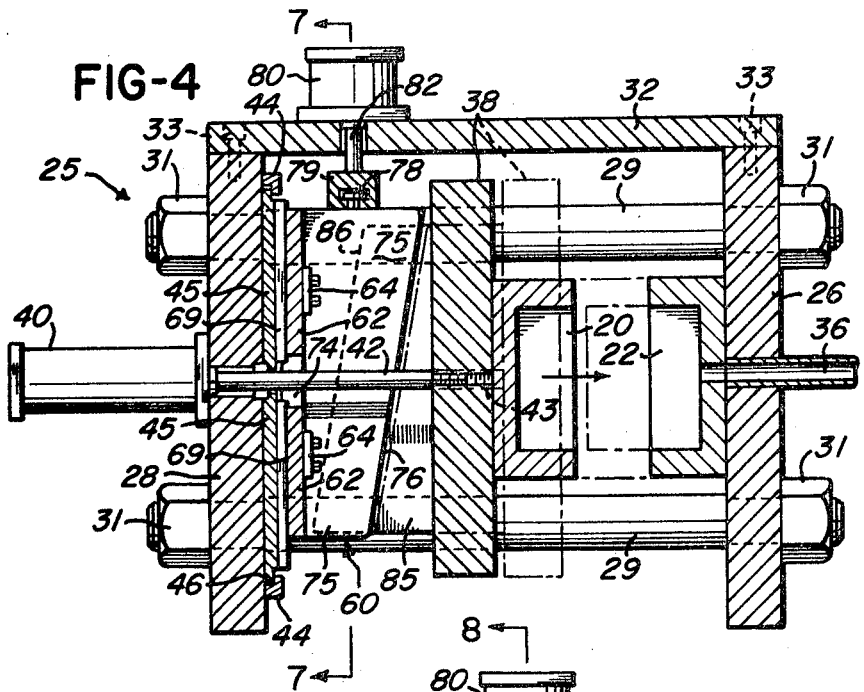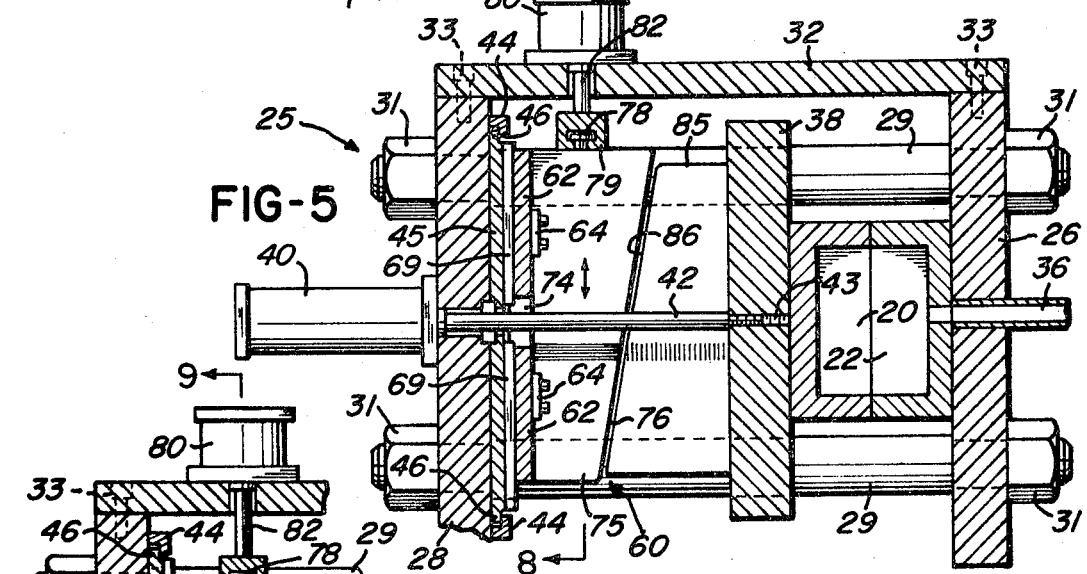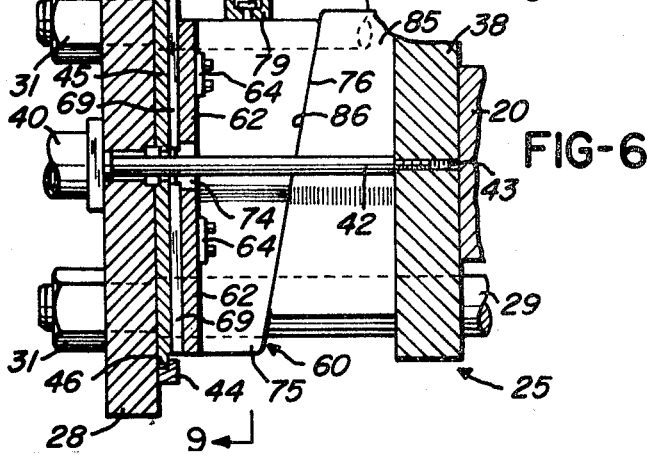

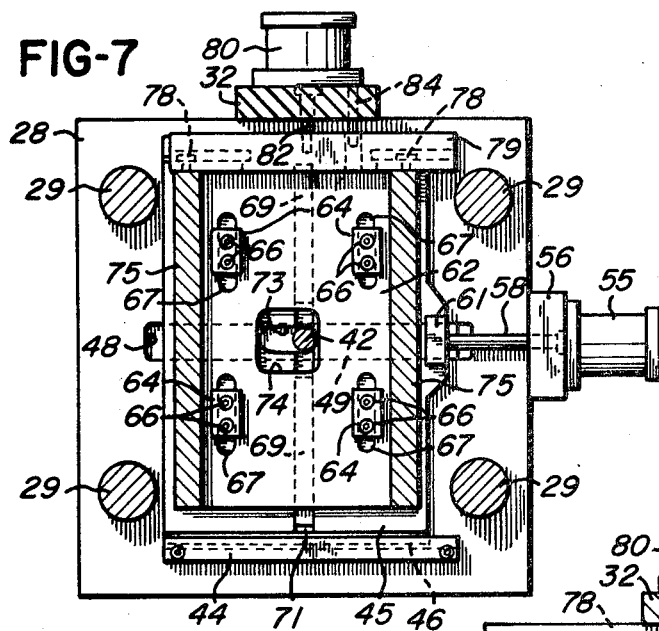
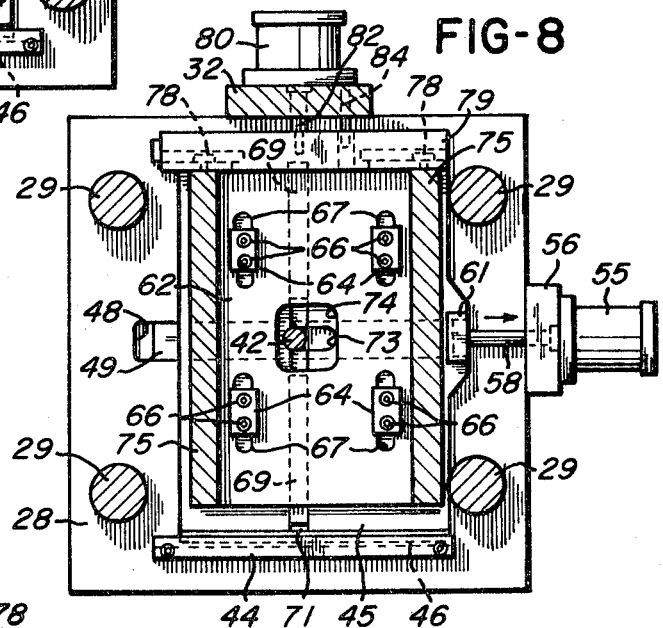
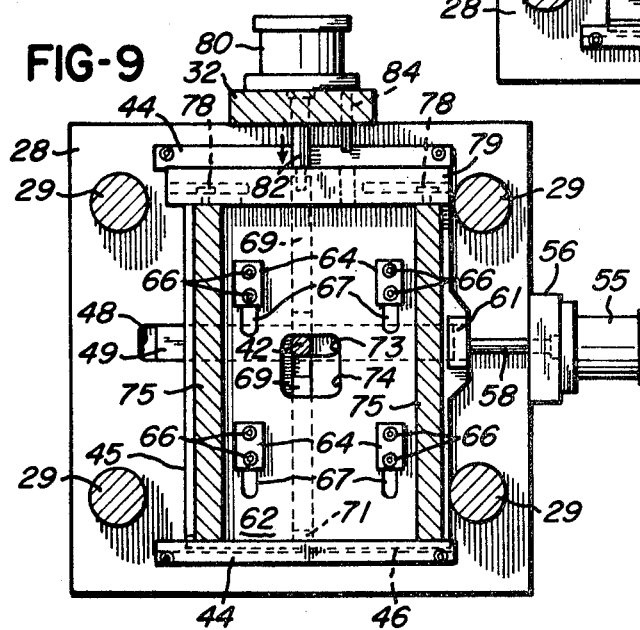

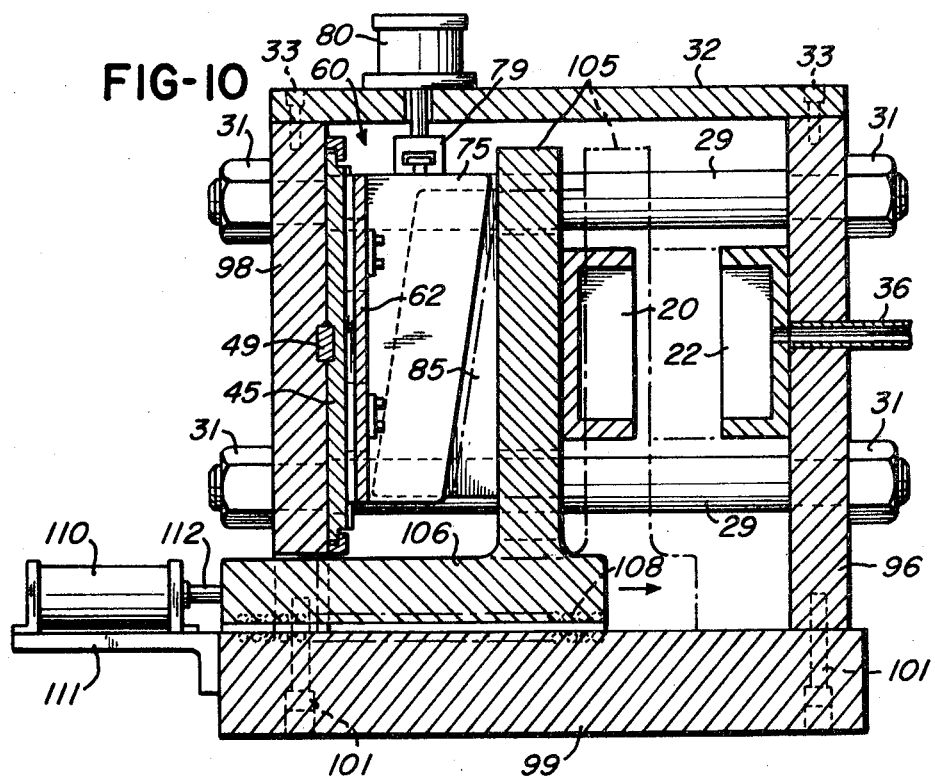
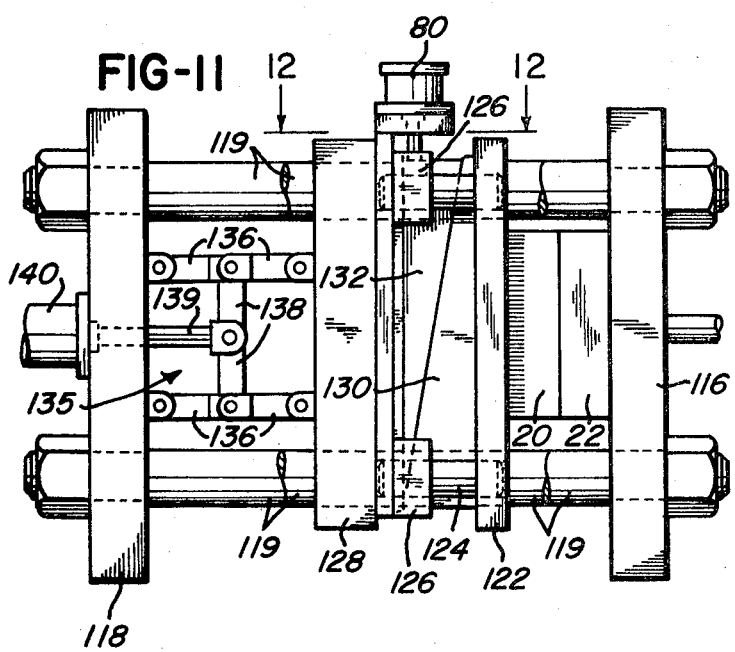
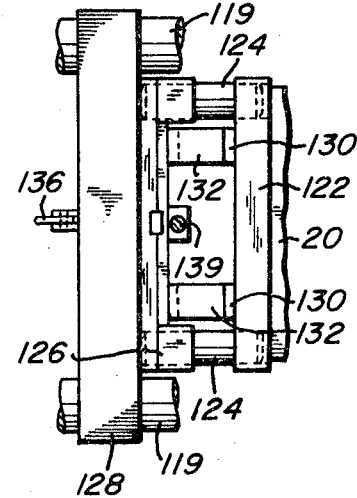
INVENTOR
JAMES H. GIBBONS
BY Jacox & Meckstroth
ATTORNEYS

MOLD CAVITY LOCKING APPARATUS

BACKGROUND OF THE INVENTION

In the art of injection molding a plastics material, it is common to mount one mold member on a stationary mold support platen and to mount the mating mold member or another platen which is supported for reciprocating movement relative to the stationary platen to provide for opening and closing of the mold members. Many forms of mold actuating devices have been used or proposed for opening and closing the mold members and for clamping and locking the mold members together in their closed positions. For example, U.S. Pat. Nos. 2,319,479 and 2,586,896 show different forms of mold locking devices which employ movable wedge members. U.S. Pat. No. 3,195,186 discloses a molding machine which employs wedge type clamping members, and U.S. Pat. No. 3,262,158 shows a machine which uses fluid actuated toggle links for locking the mold members together.

To provide for positively locking a set of mold members in their closed position, it has been found desirable to use wedge members which are placed in compression during locking of the mold members by locating the wedge members directly in back of the movable mold member support platen. It has also been found desirable to provide for quickly opening and closing the mold members to minimize the molding cycle time, and to use a mechanism which is simple and economical in construction and compensates for any wear of the mechanism. It is apparent after carefully reviewing the disclosures of the above patents, that the mold locking mechanism shown in each of the patents, is lacking in providing one or more of these desirable features.

SUMMARY OF THE INVENTION

The present invention is directed to molding apparatus which incorporates an improved mechanism for quickly opening and closing a set of mold members and for positively locking the mold members together in their closed positions. The mechanism of the invention is not only economical in construction, but also provides for compensating for any thermal expansion and wear of the mechanism to assure that the mold members are positively secured in their closed positions. As used herein, the term "mold member" is intended to include any mold or die member which is used for producing a metalic or non-metalic part or article.

In acordance with one embodiment of the invention, one member of a mold set, is mounted on a stationary head plate, and the mating mold member is mounted on a support platen which is guided for movement relative to the head plate. A pair of parallel spaced wedge plates are secured to the movable support platen and are adapted to be engaged by a corresponding pair of mating wedge plates supported for longitudinal movement by a carriage platen which is, in turn, supported for lateral movement by a base plate. The reciprocating movement of the mold support platen, the longitudinal movement of the wedge plates, and the lateral movement of the carriage platen, are produced by corresponding hydraulic cylinders.

After the mold members are closed, the relatively sliding wedge plates are effective to clamp or lock the mold members together with a continuing positive force. To open the mold members, the wedge plates are released and shifted laterally to out-of-alignment positions so that the wedge plates move into interfitting relation when the movable mold member is retracted or opened. Thus the locking device of the invention provides for quickly opening and closing the mold members so that the cycle time of the molding operation, is minimized. In another embodiment of the invention, a quick acting toggle mechanism is used to open and close the mold members, and both sets of wedge plates are moved as a unit with the movable mold member.

Other features and advantages of the invention will be apparent from the following description, the accompanying drawings and the appended claims.

BRIEF DESCRIPTION OF THE DRAWINGS

FIG. 1 is an exploded perspective view of molding apparatus constructed in accordance with the invention;

FIG. 2 is a plan view of the assembled mold support apparatus shown in FIG. 1, with a portion broken away and with the mold members shown in open positions;

FIG. 3 is a plan view similar to FIG. 2 and showing the mold members in closed positions;

FIG. 4 is a section taken generally on the line 4—4 of FIG. 2;

FIG. 5 is a section taken generally on the line 5—5 of FIG. 3. and illustrating the locking mechanism before it is actuated;

FIG. 6 is a fragmentary section similar to FIG. 5 and showing the locking mechanism in its locked position;

FIG. 7 is a section taken generally on the line 7—7 of FIG. 4;

FIG. 8 is a section similar to FIG. 7 and taken generally on the line 8—8 of FIG. 5;

FIG. 9 is a section similar to FIG. 7 and 8 and taken generally on the line 9—9 of FIG. 6;

FIG. 10 is a section similar to FIG. 4 and showing a modification of the apparatus of the invention;

FIG. 11 is an elevational view similar to FIG. 6 and showing another embodiment of the invention; and FIG. 12 is a fragmentary section taken generally on the line 12—12 of FIG. 11.

DESCRIPTION OF THE PREFERRED EMBODIMENTS

Referring to FIGS. 1-3, the invention is illustrated in the form of apparatus for supporting a set of mold members 20 and 22 which are adapted to receive a molded plastic material from a suitable injection molding machine. It is to be understood, however, that the apparatus of the invention may also be used for supporting a mold or die set which is adapted to receive a metal or other material. The apparatus includes a frame 25 formed by a head plate 26 rigidly connected to a base plate 28 by a set of four tie bolts or rods 29 which receive corresponding nuts 31. The head plate 26 and base plate 28 are also rigidly connected by an upper support plate 32 secured to the head and base plates by a set of cap screws 33. The mold member 22 is rigidly secured to the head plate 26 and is adapted to receive molten plastic material through a passage schematically defined by a conduit 36.

The mold member 20 is rigidly secured to a mold support platen 38 which is slidably mounted on the tie rods 29 to provide for movement of the mold member 20 between an open position (FIG. 2) and a closed position (FIG. 3) relative to the mold member 22. The opening and the closing of the mold members 20 and 22 is produced by a double acting hydraulic fluid cylinder 40 which is mounted on the base plate 28. The cylinder 40 has a piston rod 42 which extends parallel to the guide rods 29 and has a forward end portion threaded into a hole 43 formed within the center of the support platen 38.

A pair of upper and lower tracks 44 having an L-shaped cross section, are mounted on the base plate 28 in parallel spaced relation and slidably support a carriage plate 45 having flanges 46 which are received within the tracks 44. A laterally extending slot or keyway 48 is formed within the front surface of the base plate 28 and receives a pair of key members 49 which are also partly received within a slot 51 formed within the back surface of the carriage plate 45. The key members 49 and the keyways 48 and 51 cooperate with the tracks 44 to assure that the carriage plate 45 does not twist when it is shiftd horizontally and laterally. A double acting hydraulic fluid cylinder 55 is mounted on a flange 56 secured to the base plate 28 and includes a piston rod 58 having an end portion threaded into a tapped hole 59 formed within an ear 61 secured to the carriage plate 45.

A wedge member 60 is supported by the carriage plate 45 for vertical movement and includes a wedge support plate 62 which is connected to the carriage plate 45 by a set of retaining plates 64 and a series of cap screws 66 which extend through corresponding holes within the carriage plate 45. The wedge support plate 62 is also connected to the carriage plate 45 by a pair of key members 69 which extend within a pair of mating keyways 71 and 72 formed within the carriage plate 45 and the wedge support plate 62, respectively. The carriage plate 45 and the wedge support plate 62 also have corresponding clearance holes 73 and 74 through which extends the piston rod 42 of the hydraulic cylinder 40.

The wedge member 60 also includes a pair of parallel spaced wedge elements or plates 75 which are rigidly secured to the support plate 62 and have corresponding sloping front surfaces 76. A pair of studs 78 project upwardly from the wedge plates 75 and have enlarged head portions which are slidably received within an elongated guide track 79 having a C-shaped cross-sectional configuration. A double acting hydraulic fluid cylinder 80 is mounted on the upper tie plate 32 above the wedge member 60 and has a piston rod 82 with a lower end portion threaded into a hole 83 formed within the center of the guide track 79. A guide pin 84 extends downwardly from the plate 32 and is received within a hole formed within the track 79. A pair of parallel spaced wedge elements or plates 85 are rigidly secured to the rear side of the mold support platen 38 and have corresponding sloping rear surfaces 86 which are adapted to mate with the sloping surfaces 76 of the wedge plates 75.

Referring to FIGS. 2-9, the mold support and actuating apparatus operates in the following manner. The molding of an article within the mold members 20 and 22 is commenced by actuating the hydraulic cylinder 40 to extend the piston rod 42 so that the mold support platen 38 and the attached mold member 20 move to the closed position shown in FIG. 3. The hydraulic cylinder 55 is then actuated to shift the wedge member 60 laterally so that the wedge plates 75 are aligned with the wedge plates 85 on the back of the mold support platen 38. The hydraulic cylinder 80 is then actuated to extend the piston rod 82 and thereby press the wedge plates 75 downwardly against the wedge plates 85 to the locking position shown in FIG. 9. The downward pressure on the wedge member 60 is continuously exerted during the molding operation while the thermoplastic material is injected into the cavity defined by the mold members 20 and 22.

After the article has been molded and the plastic material has solidified by the circulation of cooling water within passages (not shown) within the mold members 20 and 22, the double acting hydraulic cylinder 80 is again actuated to retract the wedge member 60 upwardly to release the locking or clamping pressure exerted on the mold support platen 38 and return the wedge member 60 to the position shown in FIG. 5. The hydraulic cylinder 55 is then actuated to extend the corresponding piston rod 58 and thereby shift the wedge member 60 laterally to a position (FIG. 2) where the wedge plates 75 are located in offset out-of-aligned relation to the wedge plates 85.

The hydraulic cylinder 40 is actuated to retract the platen 38 and the mold member 20 to its open position (FIGS. 2 and 4) relative to the mold member 22. The molded plastic part is able to drop downwardly between the bottom guide rods 29 into a suitable receiving container. When the mold support platen 38 is retracted, the wedge plates 85 are retracted into laterally adjacent interfitting relation to the wedge plates 75 as shown in FIG. 2. The cycle is repeated to perform another molding operation and to produce another molded plastic part.

Referring to FIG. 10 which shows a modification of apparatus constructed in accordance with the invention, a head plate 96 and a base plate 98 are not only rigidly connected by a series of tie rods 29 but are also rigidly connected by a bed plate 99 and a series of screws 101. The mold member 20 is supported by a platen 105 having a base portion 106 which is mounted on the bed plate 99 by one V-shaped slide way (not shown) and one antifriction way 108. The wedge members 85 are secured to the back surface of the platen 105 and are adapted to be engaged by the wedge plates 75 of the wedge member 60 in the same manner as described above in connection with the embodiment shown in FIGS. 1-9.

The platen 105 is moved on the bed plate 99 by a hydraulic fluid cylinder 110 which is mounted on a bracket 111 secured to the bed plate 99. The cylinder 110 has a piston rod 112 secured to the base portion 106 of the platen 105. This embodiment provides the feature that the weight of the platen 105 and the mold member 20 is not carried by the tie rods 29 and thereby eliminates any possible bending or downward deflection of the tie rods 29.

FIGS. 11 and 12 show another embodiment of the mold support and actuating apparatus of the invention. In this embodiment, the head plate 116 is rigidly connected to a base plate 118 by a series of tie rods 119 in the same manner as the embodiments shown in FIGS. 1-10. In this embodiment, the mold member 20 is mounted on a platen 122 which, in turn, is mounted on the forward ends of a set of four guide rods 124. The rods 124 are received within preloaded antifriction cylindrical bearings 126 which are confined within corresponding bores formed in a base platen 128 slidably mounted on the tie rods 119.

A pair of wedge plates 130 are secured to the back surface of the platen 122 and engage a corresponding pair of mating wedge plates 132 which are supported for vertical movement by the base platen 128 in the same manner as the wedge plate 75 is supported for vertical movement on the carriage plate 45 in the embodiment of FIGS. 1–9. As shown in FIG. 11, the base platen 128 is connected to the base plate 118 by a toggle mechanism 135 which includes a set of links 136 pivotally connected to each other and to the base plate 118 and the base platen 128. A set of links 138 are also pivotally connected to each other and to the links 136, and a fitting 139 connects the links 138 to the piston rod of a hydraulic fluid cylinder 140.

When the mold members 20 and 22 are in their closed positions (FIG. 11), the links 136 are aligned to form a rigid link between the platen 128 and the base plate 118. The clamping and locking of the mold members is produced by actuation of the hydraulic cylinder 80 which forces the wedge plates 132 downwardly against the wedge plates 130 to clamp or compress the mold members 20 and 24 together. After the molding operation is completed, the mold members are opened by first retracting the wedge plates 132 by actuating the cylinder 80. The quick opening of the mold members is then obtained by actuating the hydraulic cylinder 140 which quickly retracts the base platen 128 as a result of the mechanical advantage provided by the toggle mechanism 135.

From the drawings and the above description, it is apparent that a mold supporting and actuating apparatus constructed in accordance with the invention, provides desirable features and advantages. For example, the wedge plates 75 and 85 or the plates 130 and 132 cooperate to clamp and lock mold members 20 and 22 together with a force which is distributed over a substantial area of the mold members. In addition, the hydraulic cylinder 80 is effective to exert a continuing locking force which compensates for elongation of the tie rods 29 as a result of thermal expansion when the apparatus commences from a cold start up. The constant wedging force exerted by the wedge plates 75, is also effective to compensate for wear of the components after the apparatus has been in operation for an extended period of time.

Another important feature is provided by the lateral shifting of the wedge plates 75 as produced by actuating the cylinder 55. That is, by shifting the wedge plates 75 laterally after the wedge plates have been retracted upwardly, the mold support platen 38 may be quickly retracted to open the mold members, since the wedge plates 85 are free to extend into laterally offset positions interfitting with the wedge plates 75. Thus it is not necessary to retract the wedge member 60 completely out of the path of the mold support platen 38, and as a result, the operations of opening and closing the mold members may be quickly performed.

As mentioned above, the embodiment shown in FIG. 10 provides the feature of supporting the weight of the platen 105 and the mold member 20 with the bed plate 99 instead of with the tie rods 29. As a result, there is no bending of the tie rods 29, and the mold members 20 and 22 are maintained in precise alignment. The embodiment shown in FIGS. 11 and 12 provides for not only distributing the clamping or locking force over a substantial area of the mold support platen 122, but also provides for rapid opening and closing of the mold members by quickly moving the base platen 128 through actuation of the toggle mechanism 135.

While the forms of apparatus herein described constitute preferred embodiments of the invention, it is to be understood that the invention is not limited to these precise forms of apparatus, and that changes may be made without departing from the scope and spirit of the invention.

What is claimed is:

1. Molding apparatus adapted to receive first and second mating mold members, comprising a frame having means for supporting the second mold member, means mounted on said frame for supporting the first mold members for movement in a first direction between open and closed positions relative to the second mold member, means for moving the first mold member between said open and closed positions, first wedge means connected to said supporting means for the first mold member, second wedge means positioned in alignment with said first wedge means, means mounted on said frame and supporting said second wedge means for movement in a second direction generally normal to said first direction between a released position and a locked position engaging said first wedge means to effect pressing of the first mold member against the second mold member, said supporting means for said second wedge means also providing for movement of said second wedge means in a third direction laterally to both said first and second directions to an offset out-of-alignment position relative to said first wedge means to provide for quickly moving the first mold member to its open position, and means for moving said second wedge means between said locked and offset positions through said released position.

2. Apparatus as defined in claim 1 wherein said first wedge means comprise a first set of spaced wedge elements, said second wedge means comprise a second set of spaced wedge elements, and said second set of wedge elements are movable into interfitting relation with said first set of wedge elements when the first mold member is moved to said open position.

3. Molding apparatus adapted to receive first and second mating mold members, comprising a frame including a head member and a base member in substantially parallel spaced relation, a plurality of parallel tie members rigidly connecting said head and base members, said head member being adapted to receive the second mold member, a mold platen positioned between said head and base members in substantially parallel spaced relation, a base platen positioned between said mold platen and said base member in substantially parallel spaced relation, a first set of spaced wedge elements secured to said mold platen, a carriage plate supported for movement by said base platen, a second set of spaced wedge elements supported by said carriage plate and positioned in alignment with said first set of wedge elements, means for moving said carriage platen laterally and generally parallel to said base platen to provide for movement of said second set of wedge elements between locked and released positions relative to said first set of wedge elements, toggle linkage means connecting said base member and said base platen, and means for actuating said toggle linkage means to effect rapid movement of said base platen between an extended position and a retracted position relative to said base member to provide for quickly opening and closing the mold members.

4. Molding apparatus adapted to receive first and second mating mold members, comprising a frame having means for supporting the second mold member, means mounted on said frame for supporting the first mold member for movement in a first direction between open and closed positions relative to the second mold member, a first set of spaced wedge elements connected to said supporting means for the first mold member, a second set of spaced wedge elements positioned in alignment with said first set of wedge elements, means connected to said frame and supporting said second set of wedge elements for movement in a second direction generally normal to said first direction between a released position and a locked position engaging said first set of wedge elements to effect pressing of the first mold member against the second mold member, said latter supporting means also being effective to provide for movement of said second set of wedge elements in a third direction laterally to both said first and second directions to positions in offset out-of-alignment relation with said first set of wedge elements, said sets of wedge elements being movable into interfitting relation when the first mold member is moved to said open position, and means for moving said supporting means for said second set of wedge elements.

5. Apparatus as defined in claim 4 wherein said first set of wedge elements comprise a pair of parallel spaced wedge plates, said second set of wedge elements comprise a corresponding pair of parallel spaced wedge plates, and said supporting means for said latter pair of wedge plates is effective to provide for longitudinal movement of said wedge plates between said released and locked positions and lateral movement of said wedge plates between said released and offset positions.

6. Apparatus as defined in claim 5 wherein said means supporting the first mold member comprise a platen, and said first and second sets of wedge plates extend laterally across a substantial portion of said platen.

7. Apparatus as defined in claim 4 wherein said frame includes a head plate and a base plate in parallel spaced relation, a plurality of parallel tie members rigidly connecting said head and base plates, said head plate being adapted to receive the second mold member, said means for supporting the first mold member including a platen positioned between said head and base plates in parallel spaced relation, said supporting means for said second set of wedge elements includes a carriage plate supported by said base plate for movement in one direction, and said second set of wedge plates being supported by means mounted on said carriage plate for movement in a direction generally perpendicular to said one direction.

8. Apparatus as defined in claim 7 wherein said means for moving said second set of wedge elements, include a first fluid cylinder connected to move said carriage plate, and a second fluid cylinder connected to move said means supporting said second set of wedge elements.

9. Apparatus as defined in claim 8 including a third fluid cylinder mounted on said base plate and having a piston rod connected to said platen for moving the first mold member between said open and closed positions, and said carriage plate defines an opening for receiving said piston rod.

* * * * *